(12) United States Patent
Chen et al.

(10) Patent No.: US 11,768,823 B2
(45) Date of Patent: Sep. 26, 2023

(54) RULES EXECUTION SYSTEM FOR IOT DEVICES

(71) Applicant: Verizon Patent and Licensing Inc., Arlington, VA (US)

(72) Inventors: Zhong Chen, Acton, MA (US); Lin Zhu, Lexington, MA (US); Jianxiu Hao, Acton, MA (US); Fenglin Yin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1163 days.

(21) Appl. No.: 15/046,100

(22) Filed: Feb. 17, 2016

(65) Prior Publication Data

US 2017/0235783 A1   Aug. 17, 2017

(51) Int. Cl.
| | |
|---|---|
| *G06F 16/23* | (2019.01) |
| *H04L 67/10* | (2022.01) |
| *H04W 4/70* | (2018.01) |
| *H04L 67/12* | (2022.01) |
| *H04L 41/0893* | (2022.01) |
| *H04L 43/0817* | (2022.01) |

(52) U.S. Cl.
CPC ...... *G06F 16/2365* (2019.01); *H04L 41/0893* (2013.01); *H04L 67/10* (2013.01); *H04L 67/12* (2013.01); *H04W 4/70* (2018.02); *H04L 43/0817* (2013.01)

(58) Field of Classification Search
CPC .................................................... H04L 67/10
See application file for complete search history.

(56) References Cited

U.S. PATENT DOCUMENTS

| | | | |
|---|---|---|---|
| 9,665,405 B1* | 5/2017 | Goodnight | G06F 9/5072 |
| 9,900,172 B2* | 2/2018 | Goel | H04L 12/2838 |
| 2014/0244017 A1* | 8/2014 | Freiwirth | B29C 67/0088 700/100 |
| 2014/0244710 A1* | 8/2014 | Sharma | H04L 69/24 709/201 |
| 2014/0244834 A1* | 8/2014 | Gu | H04L 67/16 709/224 |
| 2015/0019710 A1* | 1/2015 | Shaashua | G06F 16/35 709/224 |
| 2015/0052308 A1* | 2/2015 | Ray | G06F 12/0875 711/125 |
| 2015/0185713 A1* | 7/2015 | Glickfield | G05B 15/02 700/44 |
| 2015/0199330 A1* | 7/2015 | Glickfield | G06N 20/00 704/9 |

(Continued)

*Primary Examiner* — Mohammad S Rostami

(57) ABSTRACT

A method includes receiving readings from a plurality of Internet of Things (IoT) devices. The method identifies rules associated with the readings from the IoT devices and determines a three dimensional (3D) dataset based on the plurality of IoT devices, the readings and rules associated with the readings from the plurality of IoT devices. The method includes determining policies to be applied to routing of the readings based on rules for dividing the readings into subsets of the 3D dataset, and routing processing for subsets of the readings to be processed in parallel by processing units based on the policies. The method further includes processing the readings to generate a list of actions, and resolving the conflicts in the list of actions based on a multi-phase queue. The method also includes executing the actions.

20 Claims, 8 Drawing Sheets

(56) References Cited

U.S. PATENT DOCUMENTS

| | | | |
|---|---|---|---|
| 2015/0279366 A1* | 10/2015 | Krestnikov | H04W 4/70 704/235 |
| 2015/0304879 A1* | 10/2015 | Dacosta | H04W 4/14 370/235 |
| 2015/0347114 A1* | 12/2015 | Yoon | H04L 12/2832 235/375 |
| 2016/0019608 A1* | 1/2016 | Smith | G06F 3/0611 705/346 |
| 2016/0128043 A1* | 5/2016 | Shuman | H04W 72/044 370/331 |
| 2016/0142877 A1* | 5/2016 | Gujral | H04W 4/70 455/456.1 |
| 2016/0198285 A1* | 7/2016 | Lin | H04L 67/12 709/209 |
| 2016/0226732 A1* | 8/2016 | Kim | H04L 12/2807 |
| 2016/0282443 A1* | 9/2016 | Steiner | G01S 5/0072 |
| 2016/0284121 A1* | 9/2016 | Azuma | H04N 13/388 |
| 2016/0306689 A1* | 10/2016 | Jain | G06F 11/0742 |
| 2016/0308957 A1* | 10/2016 | Zhang | G06F 9/4484 |
| 2016/0352685 A1* | 12/2016 | Park | H04L 63/0245 |
| 2016/0358095 A1* | 12/2016 | Dong | G06N 5/045 |
| 2016/0359864 A1* | 12/2016 | Dhaliwal | H04L 63/102 |
| 2017/0006141 A1* | 1/2017 | Bhadra | H04L 67/12 |
| 2017/0006528 A1* | 1/2017 | Bari | H04W 4/00 |
| 2017/0041316 A1* | 2/2017 | Setchell | H04L 63/0876 |
| 2017/0063611 A1* | 3/2017 | Sheba | H04L 41/0803 |
| 2017/0155703 A1* | 6/2017 | Hao | H04L 67/12 |
| 2017/0177546 A1* | 6/2017 | Heinz | G06F 17/18 |
| 2017/0195136 A1* | 7/2017 | Ghosh | H04L 45/04 |
| 2017/0201585 A1* | 7/2017 | Doraiswamy | H04L 67/1021 |
| 2017/0235585 A1* | 8/2017 | Gupta | H04L 41/12 718/1 |
| 2017/0237815 A1* | 8/2017 | Arsenault | H04W 4/70 709/217 |
| 2018/0062904 A1* | 3/2018 | Hwang | H04L 1/08 |
| 2018/0176224 A1* | 6/2018 | Cho | H04L 63/10 |

* cited by examiner

RULES EXECUTION SYSTEM FOR IOT DEVICES

BACKGROUND INFORMATION

The Internet of Things (IoT) is a network of devices, associated with physical objects or "things". IoT devices may include capabilities for exchanging data with other devices in the network and, in some instances, may be integrated into the physical objects that they monitor or are associated with, such as vending machines, door locks, security cameras, etc. The other devices in the network may include user devices or machine to machine (M2M) devices. The user devices may be associated with manufacturers and device operators while the M2M devices may receive monitoring data and provide instructions to the IoT devices. IoT devices may include electronics, software, sensors and connectivity that enable the IoT devices to collect and exchange data regarding the associated physical objects with the other devices that connect to the IoT. IoT devices may be uniquely identifiable and may communicate using M2M communication.

The installed base of IoT devices numbers in the billions of units. Each IoT device may be designed to send readings to a processing center for continuous processing against a large set of rules. IoT systems normally require real-time performance, without regard to whether the computing happens locally in the IoT device, a collocated processing device, such as a gateway device, or remotely in a datacenter or "the cloud".

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for implementing rule executions for a plurality of Internet of Things (IoT) devices in an IoT system. The systems and methods may allow high performance and scalable rule executions in the IoT system. The rule execution system may receive readings from multiple IoT devices in the IoT system. The rules execution system may include a resource policy coordinator and processing resources that may receive and process readings from the IoT devices based on rules and policies provided by the resource policy coordinator. The processing resources may include distinct processing units or task executors that may process assigned sets of readings from the IoT devices.

The resource policy coordinator may configure data dispatching resources and task executors based on a volume of sensor readings received from the IoT devices, rule characteristics and execution status of running task executors. The data dispatching resources may be divided into data dispatching units. The resource policy coordinator may give out dispatching guidance to the data dispatching units. The resource policy coordinator may assign readings to the data dispatching units and processing units (i.e., a dispatcher and task executor policy) based on rules and policies implemented with the flexibility to balance processing of complex (and/or critical) cases from the datasets with an aim of overall fast processing of the entire dataset. The resource policy coordinator may monitor datasets and processing at the data dispatching units and processing units and adjust the balance of processing resources accordingly.

The processing units may execute rules based on the readings of the assigned portions of the dataset and output a list of actions (in response to the events or readings) to an action queue. The action queue may be processed by a multi-phase action reducer to resolve potential conflicts between actions. An action generated from a low priority rule may be overridden by an action generated from a higher priority rule. The higher priority rule may includes a directive to maintain a state or perform a particular action. The list of actions may flow through a sequence of ordered queues in the multi-phase action reducer with decreasing priority. Only actions without conflicts with prior actions may be sent to be executed by a final action executor.

Figure 1:
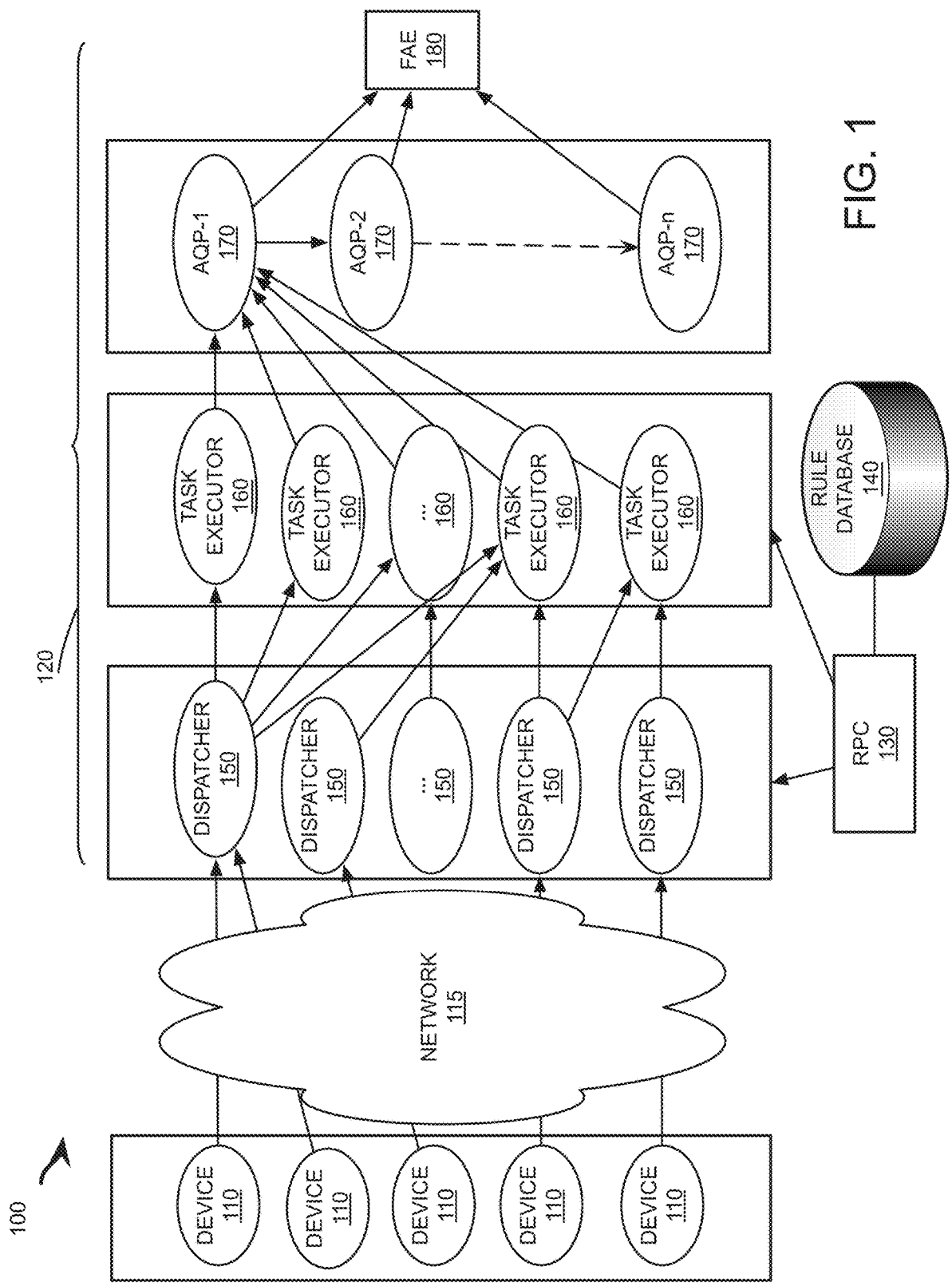
FIG. 1 illustrates an exemplary network in which systems and methods described herein may be implemented.

FIG. 1 is a diagram of an exemplary environment 100 in which systems and/or methods described herein may be implemented. As illustrated, environment 100 may include a plurality of Internet of Things (IoT) devices 110 (collectively referred to as IoT devices 110, and individually as IoT device 110), a network 115, and a rule execution system 120. Rule execution system 120 may include a resource policy coordinator 130, a rule database 140, an array of data dispatchers 150, a plurality of task executors 160, a multi-phase action reducer 170, and a final action executor 180. Components of environment 100 may be interconnected via wired and/or wireless connections. The configuration of components of environment 100 illustrated in FIG. 1 is for illustrative purposes. Other configurations may be implemented. Therefore, environment 100 may include additional, fewer, or different components than those depicted in FIG. 1. Also, in some instances, one or more of the components of environment 100 may perform one or more functions described as being performed by another one or more of the components of environment 100.

IoT device 110 may be a device that produces readings and transmits notification of events, such as a location tag, a wearable fitness band, a connected thermostat, a monitoring camera, a sensor device, or similar device that has Internet connections. IoT device 110 may be coupled with rule execution system 120 via network 115 and one or more modems, such as a Wi-Fi modem and a wireless modem (e.g., a 3G or 4G standard IP data connection). Each IoT device 110 may be designed to send readings to rule execution system 120 via network 115 for continuous processing against large set of rules. IoT device 110 (or other devices associated with, collocated or otherwise related to IoT device 110) may receive commands from applications in environment 100, including from rule execution system 120 (e.g., final action executor 180).

Network 115 may include a network capable of transmitting readings from IoT devices 110, to the rule execution system 120, such as the Internet, a public switched telephone network (PSTN), a third generation network, or a fourth generation (4G) network (e.g., a long term evolution (LTE) network). Network 115 may be based on the Global System for Mobile Communications/Enhanced Data rates for GSM evolution (GSM/EDGE) and Universal Mobile Telecommunications Service/High Speed Packet Access (UMTS/HSPA) network technologies and may operate according to the standard is developed by the 3rd Generation Partnership Project (3GPP). Alternatively, or additionally, network 115 may include one or more wired and/or wireless networks that are capable of receiving, carrying, and transmitting data, voice and/or video signals, including multimedia signals. Network 115 may include one or more packet switched networks, such as an Internet protocol (IP) based network, a local area network (LAN), a wide area network (WAN), a personal area network (PAN), an intranet, the Internet, or another type of network that is capable of transmitting data. Network 115 may include one or more high-speed data networks, such as a very high performance backbone network services (vBNS) network.

Rule execution system 120 may receive readings from multiple IoT devices 110 in the IoT system and environment 100. Rule execution system 120 may allow high performance and scalable rule executions for the IoT devices 110 in environment 100. Rule execution system 120 may receive and process readings based on programs, policies and rules that are required to react or respond to readings or events from the IoT devices 110 based on predefined responses to particular scenarios (i.e., what is happening at each IoT device 110). The responses are required to be automatically processed (because of a large volume of IoT devices 110) with preprocessing by rule execution system 120 (including execution of automated actions by IoT devices 110) and may forward results of the processing to devices associated with particular personnel for intervention if needed.

Resource policy coordinator 130 may configure the group of data dispatchers 150, and task executors 160 based on sensor reading volume, rule characteristics that are applied to the IoT devices 110 and a current execution status of each of the running task executors 160, such as described below with respect to FIG. 3. Resource policy coordinator 130 may access a dispatcher and task executor policy stored in a rule database 140, such as described below with respect to FIG. 4. The dispatcher and task executor assignment policy may be designed and implemented with flexibility to handle processing of complex cases while balancing an aim of overall fast processing. Resource policy coordinator 130 may monitor the rules and task executors 160 to ensure that processing is maintained within this objective. Resource policy coordinator 130 may also provide dispatching guidance to data dispatchers 150.

Data dispatcher 150 may assign datasets of readings and events from IoT devices 110 to task executors 160 based on the dispatcher and task executor assignment policy and guidance provided by resource policy coordinator 130, such as described herein below with respect to FIG. 5. Data dispatcher 150 may receive datasets that need to be processed from IoT devices 110. Data dispatcher 150 may receive, in some instances non-stop, sensor readings (and event notifications) from IoT devices 110 in the order of thousands, millions or billions of devices with large amount of rules that govern the sensor to device relationship for each IoT device 110.

Task executors 160 may include portions of the computing resources segmented (or divided) into units to process events and readings from IoT devices 110 and output one or more prospective actions or responses, such as described herein below with respect to FIG. 6. The computing resources may include dedicated physically separated processing units or virtual machines. Task executors 160 may receive and process datasets, including complex datasets, in a manner that enhances overall fast processing while balancing the requirements of the complex and critical cases. Complex datasets may include instances in which the relationship between variables requires significantly more computing power when compared to an average dataset while critical cases or datasets include those datasets that require a response within a predetermined time and have a critical impact on a system associated with the IoT devices 110 and take precedence over other IoT devices 110 (e.g., a fire alarm, a security alarm, industrial systems monitoring, etc.).

Multi-phase action reducer 170 may receive the output list of actions from the task executors and perform an additional phase of action reducer to resolve potential conflicts, such as described herein below with respect to FIG. 7. Multi-phase action reducer 170 may include action queue phases 170-1 to 170-n that correspond to prospective actions output by the task executors 130. Multi-phase action reducer 170 may operate on the list of actions produced by rule executions by task executors 160 to resolve conflicts in the actions. For example, actions generated from low priority rule may be overridden by actions generated based on a higher priority rule.

Final action executor 180 may execute actions based on events and readings without conflicts with prior actions. Final action executor 180 may provide commands to execute the actions to the IoT devices 110.

In implementations described herein, systems and methods may process readings and events from IoT devices 110 and allow high performance and scalable rule executions in the IoT system. The rules execution system may include a resource policy coordinator 130 and processing resources that may receive and process readings from the IoT devices based on rules and policies.

Figure 2:
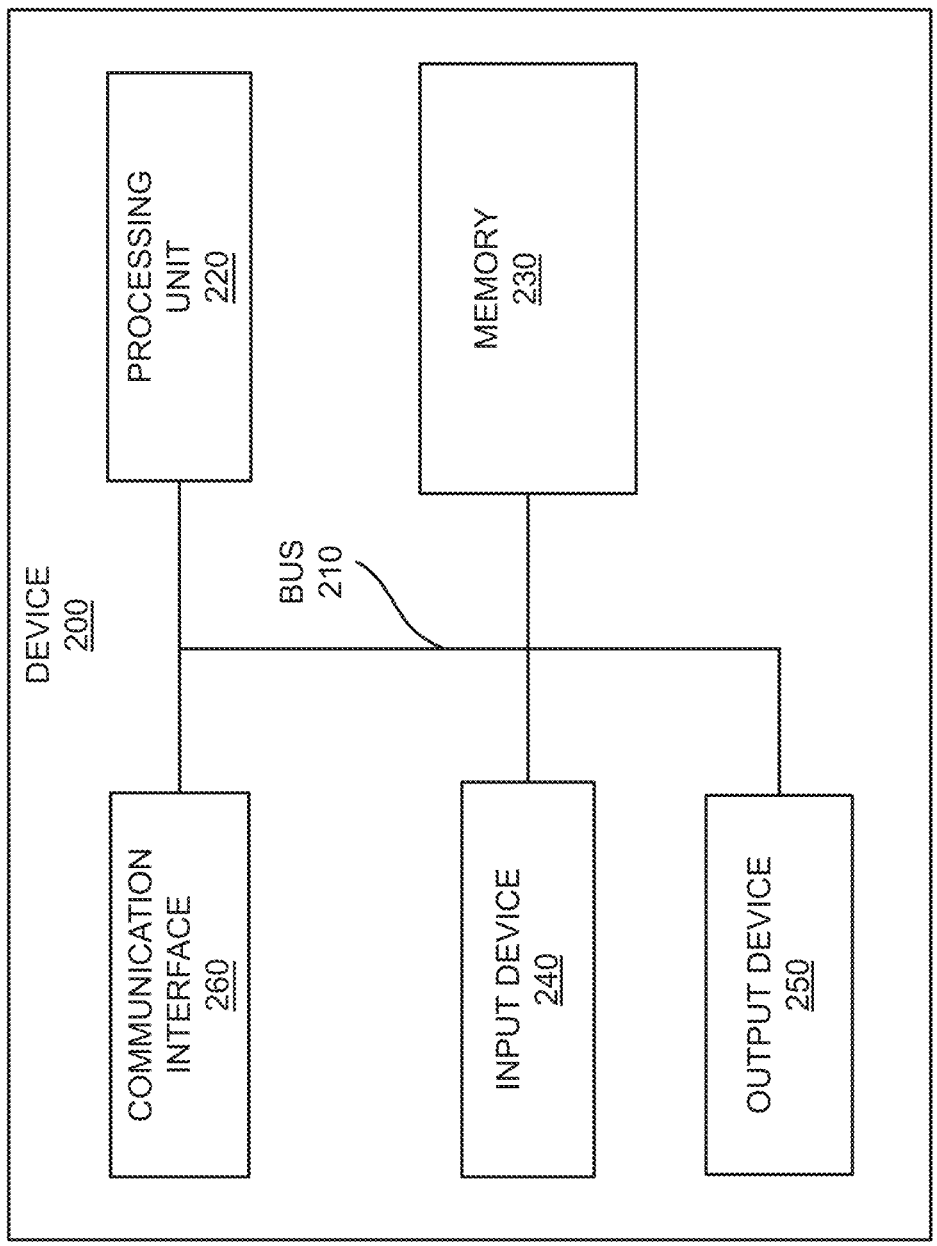
FIG. 2 illustrates an exemplary configuration of one or more of the components of FIG. 1.

FIG. 2 is a diagram of exemplary components of a device 200 that may correspond to one or more devices of environment 100, such as IoT device 110, resource policy coordinator 130, data dispatcher 150, task executor 160, multi-phase action reducer 170, and/or final action executor 180. As illustrated, device 200 may include a bus 210, a processor 220, a main memory 230, a read-only memory (ROM) 240, a storage device 250, an input device 260, an output device 270, and a communication interface 280. Bus 210 may include a path that permits communication among the components of device 200.

Processor 220 may include one or more processors, microprocessors, or other types of processing units that may interpret and execute instructions. Main memory 230 may include a random access memory (RAM) or another type of dynamic storage device that may store information and instructions for execution by processor 220. ROM 240 may include a ROM device or another type of static storage device that may store static information and/or instructions for use by processor 220. Storage device 250 may include a magnetic and/or optical recording medium and its corresponding drive.

Input device 260 may include a mechanism that permits an operator to input information to device 200, such as a remote control, control buttons, a keyboard, a mouse, a pen, a microphone, voice recognition and/or biometric mechanisms, a touch screen, etc. Output device 270 may include a mechanism that outputs information to the operator, including a display, an indicator light, a speaker, etc. Communication interface 280 may include any transceiver that enables device 200 to communicate with other devices and/or systems. For example, communication interface 280 may include mechanisms for communicating with another device or system via a network.

As described herein, device 200 may perform certain operations in response to processor 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
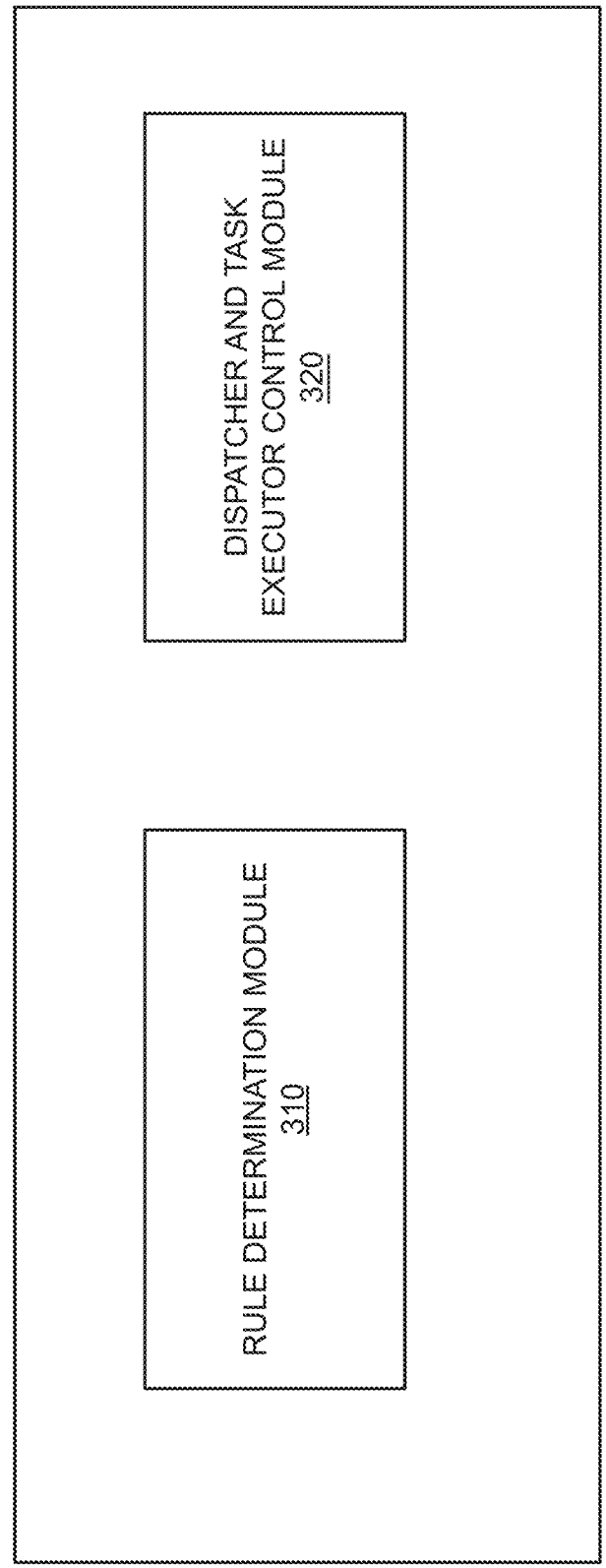
FIG. 3 is a functional block diagram of the resource policy coordinator of FIG. 1.

FIG. 3 is a diagram of exemplary functional components of resource policy coordinator 130. In one implementation, the functions described in connection with resource policy coordinator 130 may be performed by one or more components of device 200 (FIG. 2). As shown in FIG. 3, resource policy coordinator 130 may include rule determination module 310, and dispatcher and task executor control module 320.

Each of the IoT devices 110 may be capable of constantly producing events or data (e.g., a thermometer, a factory line quality control monitor, an alarm, etc.) and transmitting the events to rule execution system 120. For example, the IoT device 110 may transmit a temperature reading every 10 seconds. In another example, IoT devices 110 may include a security camera that is required to send out notification of detected events immediately, such as in response to detected motion. In a further example, IoT devices 110 may require activation of camera recording, lights and audio guidance into associated buildings based on motion sensor. The IoT devices 110 may transmit readings that comprise a large dataset that require a large amount of associated rules for processing the readings. Resource policy coordinator 130 may access rules and policies and determine the allocation of processing resources to execute the rules and optimize response time and handling of critical events.

Rule determination module 310 may analyze the datasets received at data dispatchers 150 from IoT devices 110 and provide rules, policies and guidance to be applied to determine actions based on each of the readings and events from the IoT devices 110. Rule determination module 310 may analyze the datasets to identify particular IoT devices 110 (or classes of IoT devices 110) that transmit readings to data dispatchers 150. Rule determination module 310 may access rules stored in rule database 140 and provide the rules to task executors 160. Rule determination module 310 may access a dispatcher and task executor assignment policy that balances complex cases and overall processing speeds for the dataset.

Dispatcher and task executor control module 320 may configure data dispatchers 150, and task executors 160 to execute rules and policies based on sensor reading volume, rule characteristics and execution status of task executors 160. Dispatcher and task executor control module 320 may communicate with rule database 140 and access policies and rules that determine the assignment of datasets to task executors 160. For example, Dispatcher and task executor control module 320 may access a policy that randomly assigns each task executors 160 with a predetermined number of IoT devices 110, events and rules over particular predetermined time spans (e.g., each task executor 160 may be assigned to process 100 IoT devices 110, 200 events, 100 rules in every 10 seconds).

Dispatcher and task executor control module 320 may monitor the rules and task executors 160. Dispatcher and task executor control module 320 may also provide dispatching guidance (or instructions) to data dispatchers 150. Dispatcher and task executor control module 320 may provide guidance based on general principles for processing the dataset. The guidance may provide a general principle that the data dispatchers 150 may take into account in the process of routing the data to task executors 160 while the instructions may provide a fixed directive to perform particular routing protocols.

For example, dispatcher and task executor control module 320 may provide dispatching guidance to dispatchers 150. Dispatcher and task executor control module 320 may apply general principles such as device affinity, rule affinity, priority and maximum parallelism. Dispatcher and task executor control module 320 may apply the general principles concurrently, and may assign higher precedence to particular principles based on the IoT devices 110 and system objectives.

Device affinity may include a requirement (or guidance/guideline) that the IoT devices 110 that are related via particular contexts (or in some instances, any context) are to be processed within a span of a minimal, and predefined, number of task executors 160. Accordingly, dispatcher and task executor control module 320 may provide guidance to the data dispatchers 150 to group datasets from IoT devices 110 that are related by the particular context and to dispatch the datasets to IoT devices 110. Dispatcher and task executor control module 320 may also provide precedence for particular groupings of context over other groupings of datasets by context based on processing efficiencies.

Rule affinity may include a requirement (or guidance/guideline) that rules with similar properties should be assigned to the same (or same set of) task executors 160 when possible. This may maximize the speed of execution of processes when all rules related to a particular type of IoT device 110 are executed together. Accordingly, dispatcher and task executor control module 320 may provide guidance to the data dispatchers 150 to group datasets from IoT devices 110 that are governed by rules with similar properties.

Priority may include a requirement (or guidance/guideline) that high priority devices, rules, or events should have a dedicated pool of task executors 160 for fast response whenever possible. Dispatcher and task executor control module 320 may provide guidance to the data dispatchers 150 to group datasets from high priority devices, rules, or events to the dedicated pool of task executors 160. The dedicated pool of task executors 160 may be selected based on relatively superior processing attributes (e.g., faster processing speeds, central processing unit (CPU) power, etc.).

Maximum parallelism may include a requirement (or guidance/guideline) that whenever possible, unrelated events/rules should be assigned to different task executors 160. Dispatcher and task executor control module 320 may provide guidance to the data dispatchers 150 to separate datasets from unrelated events/rules when assigning to task executors 160

Figure 4:
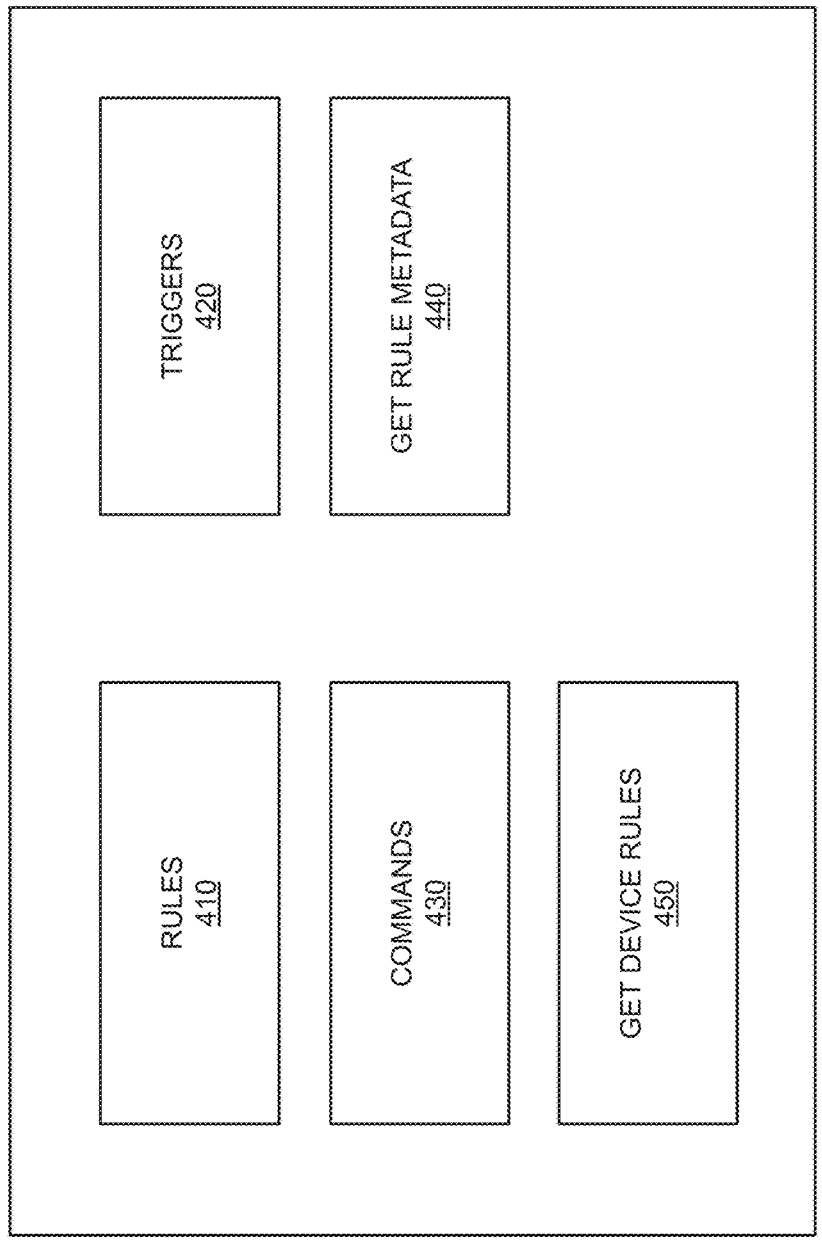
FIG. 4 is a functional block diagram of the dispatcher device of FIG. 1.

FIG. 4 is a diagram of exemplary information stored in and used to access data processing rules in rule database 140. As shown in FIG. 4, rule database 140 may include rules 410, triggers 420, commands 430, get rule metadata 440, and get device rules 450.

Rules 410 may include conditional rules for processing readings and events generated by the IoT devices 110 and the evaluation of the rules 410 may be triggered by the user input. A rule 410 may be defined by a description of a specific situation with regards to a specific system, user and a trigger 420 and a description of a reaction (command) 430 of the system when confronted with the situation.

Each trigger 420 may contain sets of attributes that a user may use to set a trigger for initiating particular actions. For example, the trigger 420 for a light sensor may be formulated as: "triggers": "id":1, "sensor category": "LIGHT", "attributes":["name": "brightness", "type": "FLOAT", "unit": "n/a", "minRange":0, "maxRange":0, "required": false, "percentage": false], "operator Conditions".

In this example, trigger 420 may include a sensor category which defines the type of sensor, in this instance a light sensor. Attributes of the trigger may include a name (in this instance brightness), a type (in this instance float), units (not applicable), a range (minimum range and maximum range), required (false) and a percentage (false). The trigger 420 may also include operator conditions under which the trigger 420 may be detected (e.g., a threshold value at (or above or alternatively below) which a condition or event may be reported).

Command 430 may include commands to be executed in instances in which the trigger 420 is detected. A user may choose the command 430, including a target to be executed once the trigger condition is satisfied by the supplied data.

Get rule metadata 440 may include an API via which metadata information may be requested from rule database 140 (e.g., by resource policy coordinator 130). Get rule metadata may include a representational state transfer (REST) API that the resource policy coordinator 130 may call (or invoke/access) to get metadata information for rules 410 (e.g., stored as /devices/rules/meta).

Exemplary output from the REST API may include: "triggers":[{"id":1, "sensor category": "LIGHT", "attributes":[{"name": "brightness", "type": "FLOAT", "unit": "n/a", "minRange":0, "maxRange":0, "required": false, "percentage": false}], "operator conditions":[">", "<", "=", "!="] "commands":[{"actuator Type": "n/a", "commands": [{"name": "on", "attributes": { }{"name": "off", "attributes": {{"actuator Type": "lt", "commands":[{"name": "on", "attributes":{{"name": "off", "attributes": {"actuator Type":"lt", "commands":["name": "on", "attributes": {"name": "off", attributes":{"name": "dim", "attributes": ["name": "brightness", "type": "FLOAT", "unit":"%", "minRange":0, "maxRange":100, "required": true, "percentage": true.

As shown, get rule metadata 440 may include fields, such as triggers, a sensor category (light), attributes, a type, a range, commands, etc.

Get device rules 450 may provide an application programming interface (API) to get pre-defined rules for selected IoT devices 110 (e.g., stored as /{device ID}/rules). Here is the sample output data for the API. Exemplary output from the get device rules API may include: device rules "rule ID": 1, "rule Name": "Turn Light Off", "enabled": true, "trigger": {"virtual Device ID": "Service Provider-IoT-00001", "sensor ID": "1", "thing Type": "sen", "thing Category": "sensor", "thing Category Type": "Light Sensor", "property": "brightness", "selected Operator Condition": ">", "operand": "200", "trigger ID": 2}, "commands": [{"virtual Device ID": "Verizon-IoT-00001", "actuator ID": "1", "thing Type": "lt", "thing Category": "actuator", "thing Category Type": "Light", "command": {"command Name": "off"}}]}, {"rule ID": 2, "rule Name": "Turn Light On", "enabled": false, "trigger": {"virtual Device ID": "Service Provider-IoT-00001", "sensor ID": "1", "thing Type": "sen", "thing Category": "sensor", "thing Category Type": "Light Sensor", "property": "brightness", "selected Operator Condition": "<", "operand": "200", "trigger ID": 2}, "commands": [{"virtual Device ID": "Service Provider-IoT-00001", "actuator ID": "1", "thing Type": "lt", "thing Category": "actuator", "thing Category Type": "Light", "command": {"command Name": "on"}}}"rule ID": 3, "rule Name": "Take A Picture", "enabled": true, "trigger": {"virtual Device ID": "Service Provider-IoT-00002", "sensor ID": "1", "thing Type": "sen", "thing category": "sensor", "thing category Type": "Motion Sensor", "property": "movement", "operand": "true", "trigger ID": 1}, "commands": [{"virtual Device ID": "Service Provider-IoT-00006", "actuator ID": "1", "thing Type": "camera", "thing Category": "actuator", "thing Category Type": "Camera", "command": {"command Name": "take Picture"}.

As shown, the get device rules 450 API output may include fields that indicate the identity of the IoT device 110 and define aspects of the operation and rules by which the readings from the IoT device 110 may be analyzed and corresponding commands executed such as triggers, a sensor category (light), attributes, a type, a range, commands, a virtual device identifier (ID), a thing type (light (lt), IDs for the type of sensor (e.g., thing type (sensor (sen)), thing category (actuator), thing category type, "Motion Sensor", device ID of Service Provider-IoT-00006), a property (movement), etc.

Figure 5:
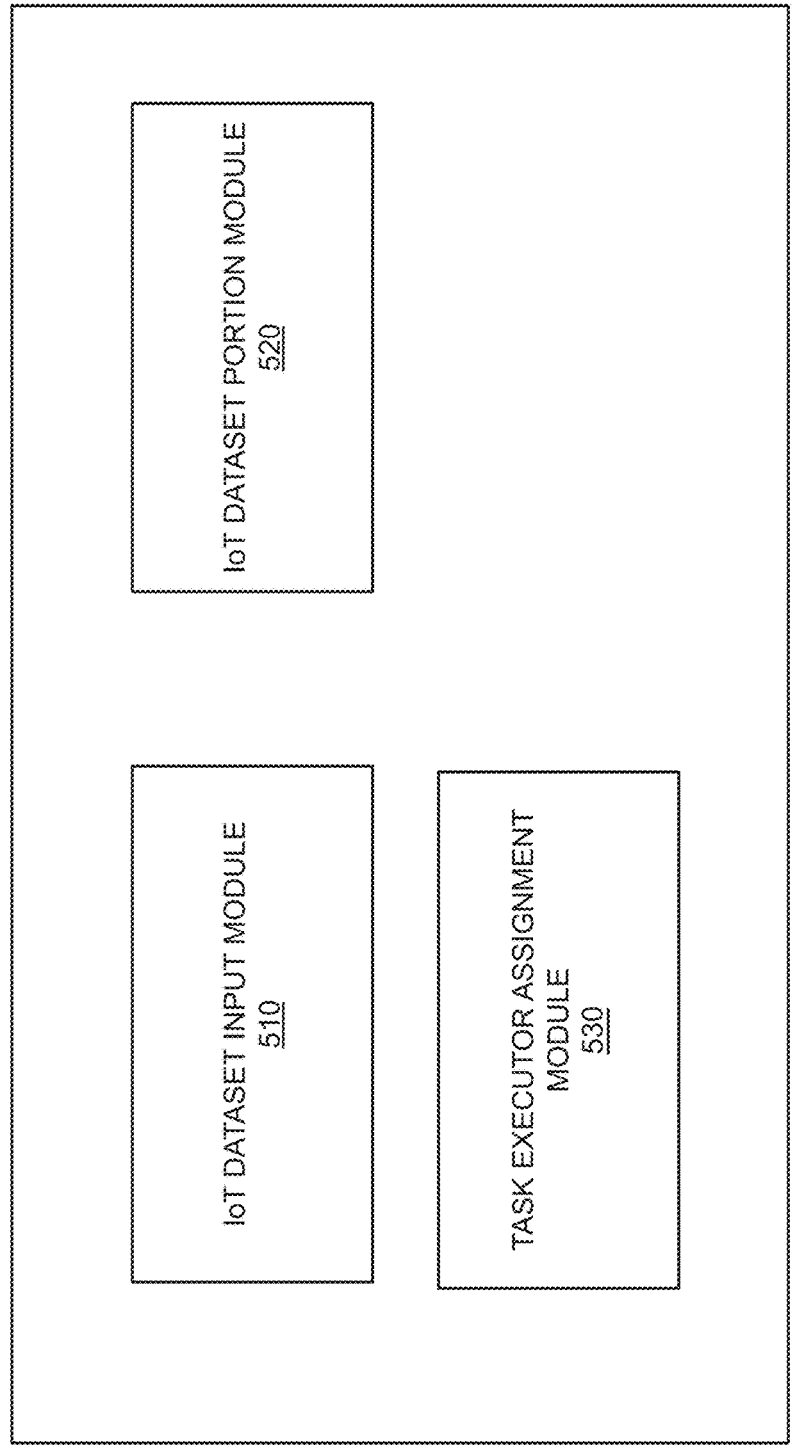
FIG. 5 illustrates a functional block diagram of the parallel process executor of FIG. 1.

FIG. 5 is an exemplary functional block diagram of data dispatcher 150. As shown in FIG. 5, data dispatcher 150 may include IoT dataset input module 510, IoT dataset portion module 520 and task executor assignment module 530. Other configurations may be implemented. Therefore, data dispatcher 150 may include additional, fewer and/or different components than those depicted in FIG. 5.

IoT dataset input module 510 may receive datasets of readings and events from IoT devices 110. IoT dataset input module 510 may receive the readings from the IoT devices 110 in real time via network 115.

IoT dataset portion module 520 may divide the dataset ((number of devices) times (number of readings in time period) times (number of rules)) into different buckets (or subsets). In this instance the dataset may be analyzed as a three dimensional (3D) dataset in which devices, readings and rules are the dimensions. IoT dataset portion module 520 may send readings to task executors 160 for processing based on rules and guidance provided by resource policy coordinator 130. IoT dataset portion module 520 may send readings that are generated out of the same rule or building to similar task executors 160. IoT dataset portion module 520 may divide datasets in the 3D dataset (or bucket) based on relationship between portions of datasets based on the rules, device affinity, geographic location of IoT devices 110, etc.

IoT dataset portion module 520 may assign processing for related devices, such as IoT devices 110 that are grouped together by rule, to common task executors 160. For example, if IoT device 100 A is doing action 1 and triggers IoT device 100 B to perform action 2 then IoT dataset portion module 520 may group processing the output of IoT device 100 A and IoT device 100 B together. IoT dataset portion module 520 may also group geographically related IoT devices 110 (e.g., all readings from those two devices need to be processed by similar task executors 160) so that it is not required to fetch data from different servers and remote database. For example, a rule may state that a high temperature reading will trigger the fans and AC to turn on in the same room. Data dispatcher 150 may receive dispatching guidance (or commands) from resource policy coordinator 130 to route processing for the fans and ACs to the same task executors 160.

Task executor assignment module 530 may output the readings to task executors 160 for processing. Task executor assignment module 530 may assign the readings to task executors based on a current running status of the task executors 160 or based on predetermined instructions for assignment of processing load associated with particular rules, readings, or devices.

Figure 6:
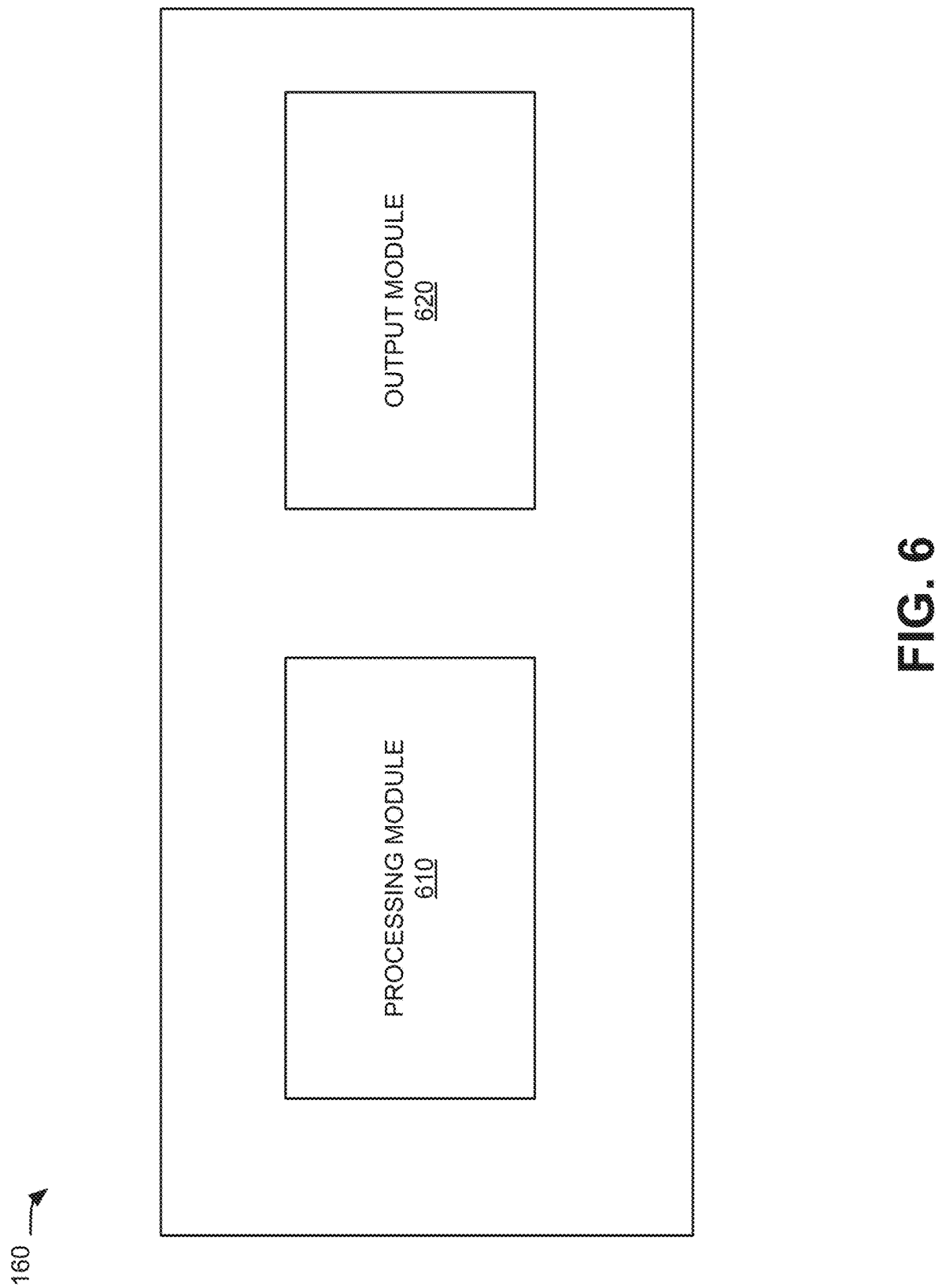
FIG. 6 depicts a functional block diagram of the multi-phase action reducer of FIG. 1.

FIG. 6 is an exemplary functional block diagram of task executor 160. As shown in FIG. 6, task executor 160 may include processing module 610, and output module 620. Other configurations may be implemented. Therefore, task executor 160 may include additional, fewer and/or different components than those depicted in FIG. 6.

Each bucket or portion of readings from the IoT devices 110 that is output by the task executor assignment module 530 may be assigned to be processed by computing resources (i.e., task executors 160) that are scheduled for parallel processing along with other task executors 160.

In some instances, high priority task executors 160 may be assigned for processing of particular readings from IoT devices 110. Data dispatchers 150 may potentially assign processing to these high priority task executors 160 based on the priority or critical aspects of the IoT devices 100. Data dispatchers 150 may limit the amount of processing or number of events assigned for processing by the high priority task executors 160. Low priority processing may be sent to another set of task executors 160 for parallel processing in a manner that maximizes the processing of the readings/events while processing critical events.

Processing module 610 may take events assigned to it and execute rules to produce actions. In some instances, some IoT devices 110 may be assigned a higher priority than others and handling of processing of readings from these IoT devices 110 may be more critical. For example, security cameras may require a higher priority for processing versus temperature sensor for weather forecast. Processing module 610 may fast track processing for critical rules or critical devices to output determined actions to the multi-phase action reducer 170 faster.

Output module 620 may output the determined actions to multi-phase action reducer 170. In some instances, output module 620 may output conflicting actions to multi-phase action reducer 170, which may require resolution of conflicts.

Figure 7:
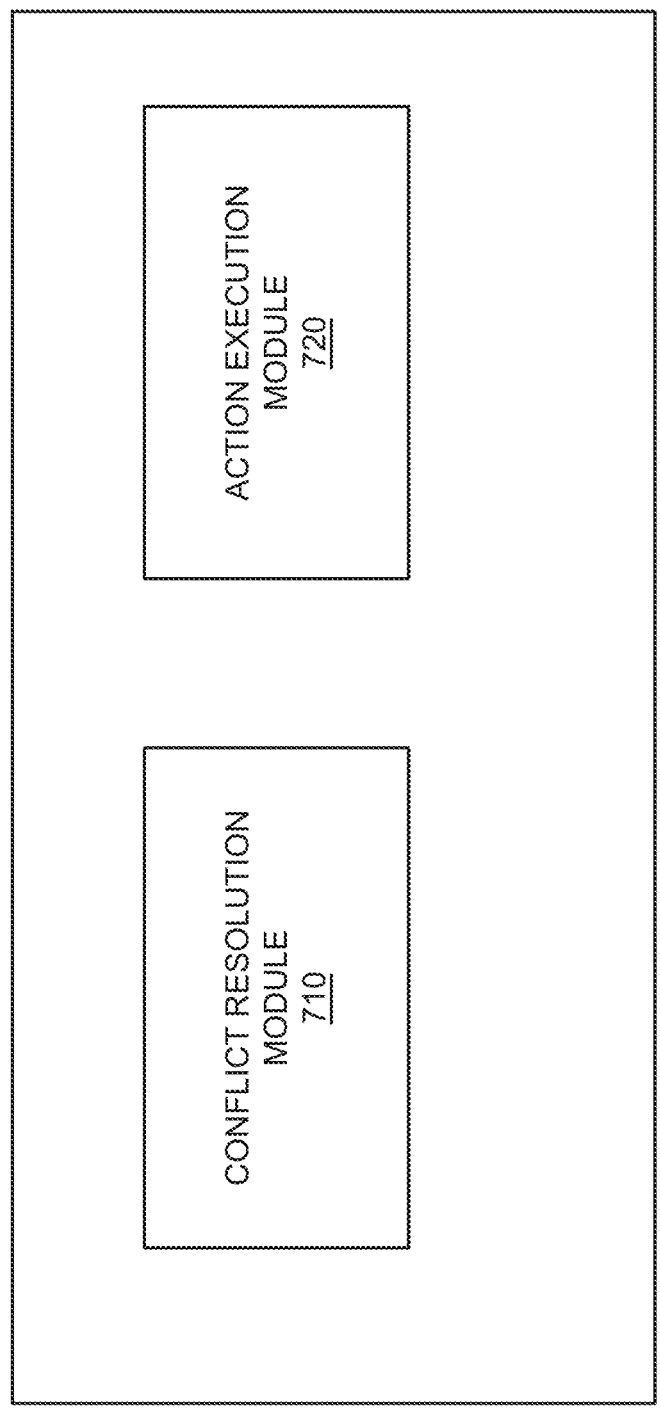
FIG. 7 depicts a functional block diagram of the final action reducer of FIG. 1.

FIG. 7 is an exemplary functional block diagram of multi-phase action reducer 170. As shown in FIG. 7, multi-phase action reducer 170 may include conflict resolution module 710, and action execution module 720. Other configurations may be implemented. Therefore, multi-phase action reducer 170 may include additional, fewer and/or different components than those depicted in FIG. 7.

Conflict resolution module 710 may receive a list of actions from task executors 160. Rule executions by the task executors 160 may produce the list of actions. Most actions generated by the rules in environment 100 may be capable of being executed in parallel (e.g., simultaneously or contemporaneously). Conflict resolution module 710 may provide an extra phase of action reduction to resolve potential conflicts that may occur during execution of resulting actions. For example, an action generated from a low priority rule may be overridden by an action generated based on a higher priority rule. Conflict resolution module 710 may process rule conflict based on a flow of the list of actions through a sequence of ordered queues (e.g., action queue phases 170-1 to 170-n, as shown in FIG. 1) with decreasing priority. Conflict resolution module 710 may address the conflicts with an exception handling procedure that ensures that the objectives of the system are maintained.

According to one example embodiment, the IoT devices 110 include devices controlled by a hospital patient management system and the following rules are applied to devices in the system. The rules are applied with different levels of priority. For example, rule 1: (Priority 1) If a patient with a particular critical condition occupies a room, keep the fan off. Rule 2: (Priority 3) If a patient room temperature is higher than 70 degrees, turn on a fan.

All rules may potentially be executed in parallel. Conflict resolution module 710 may ensure that actions generated from lower priority rules may only be executed when a higher priority conflicting rule is not in effect for the IoT device 110. For example, if rule 1 is in effect and a threshold trigger for rule 2 is met, the action associated with rule 2 will not be triggered. For example, a high priority rule in an intensive care unit (ICU) may require keeping the fan off at all times except when overridden based on specific particular instructions. Conflict resolution module 710 may override rules and/or may trigger alternative action in instances in which the higher priority rule conflicts with a lower priority rule (e.g., may provide a warning to a device associated with particular personnel and not automatically initiate cooling action even though the room temperature is above the threshold temperature).

Action execution module 720 may prioritize actions and then execute the higher priority actions associated with the same IoT devices 110 or related IoT devices 110 (e.g., an air conditioner and a fan in the ICU unit). Action execution module 720 may produce an action based on a multistage process to ensure scalable and efficient way of processing events. For example, action execution module 720 may apply different action queue phases associated with particular IoT devices 110 and compare the results of different combinations of actions to determine whether a particular action should be executed. Only actions without conflicts with prior actions (or higher priority actions) may be sent to final action executor 180 for execution and implementation.

Figure 8:
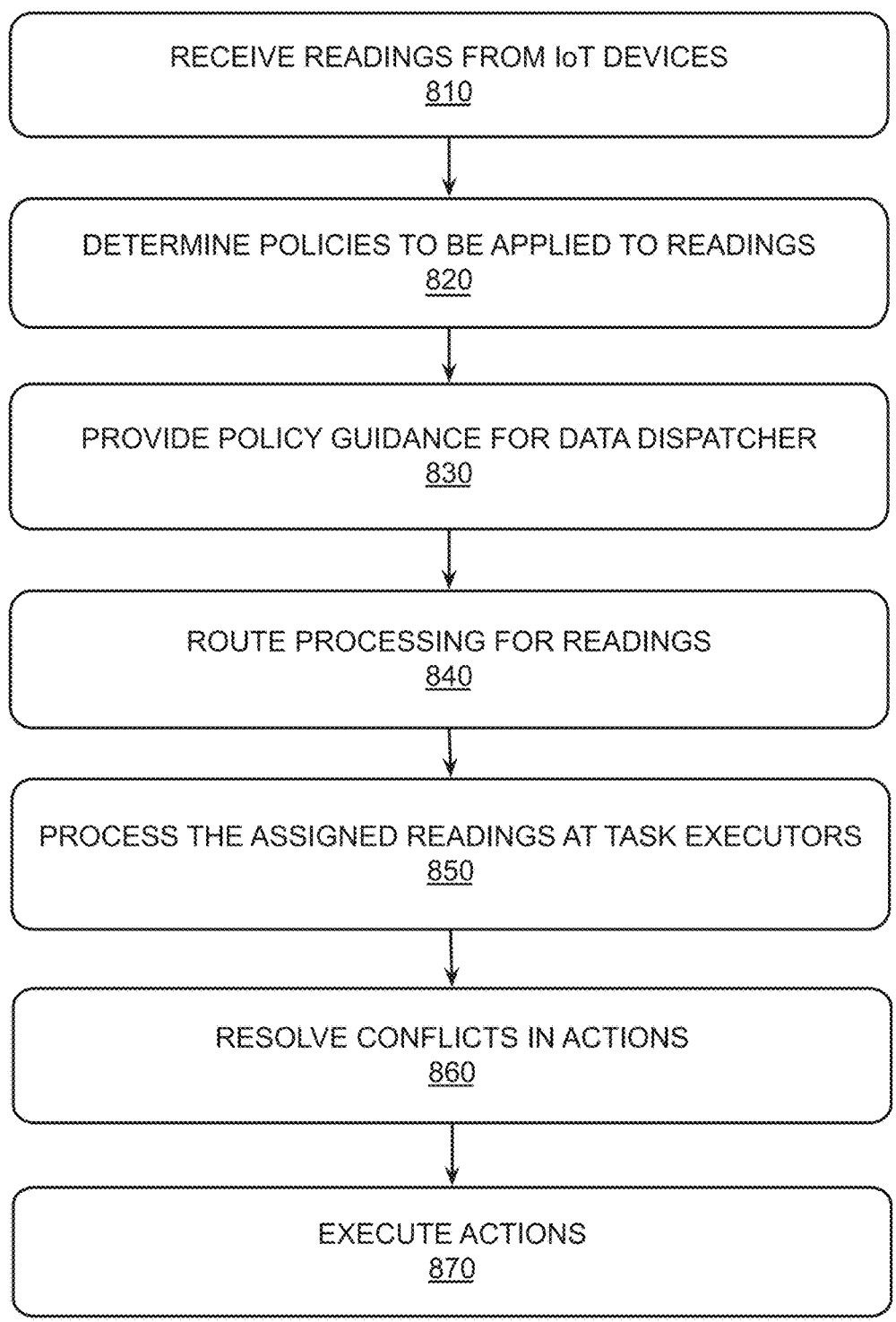
FIG. 8 is a flowchart of an exemplary process for implementing rule execution for a plurality of IoT devices in an IoT system.

FIG. 8 is a flowchart of an exemplary process 800 for implementing rule execution for a plurality of IoT devices 110 in an IoT system. Process 800 may execute in rule execution system 120. It should be apparent that the process discussed below with respect to FIG. 8 represents a generalized illustration and that other blocks may be added or existing blocks may be removed, modified or rearranged without departing from the scope of process 800.

At block 810, rule execution system 120 may receive readings (e.g., sensor readings, event notification, etc.) from multiple IoT devices 110. For example, IoT devices 110 such as a video camera, temperature sensor, motion sensor, etc., may send readings to rule execution system 120.

At block 820, resource policy coordinator 130 may determine policies and rules to be applied to the readings. For example, resource policy coordinator 130 may apply a policy to ensure that the readings are load balanced and processed in a maximum parallel way. Resource policy coordinator 130 may determine that particular IoT devices 110 are to be processed together. Resource policy coordinator 130 may determine that similar events are to be processed by particular task executors 120 based on event affinity. Resource policy coordinator 130 may analyze rules applied to real time scenarios and derive policies for routing readings and processing the readings to be applied at data dispatchers 150 and task executors 160 from the rules.

Resource policy coordinator 130 may provide policy guidance for data dispatchers 150, and task executors 160 based on rules defined by user (block 830). For example, resource policy coordinator 130 may also send related readings (e.g., from IoT devices 110 located together) to a same task executor 160 (or group of task executors 160) because the IoT devices 110 may be required to access other readings from other IoT devices 110 in order to make a determination to execute a particular action.

Data dispatchers 150 may route processing for readings from particular subsets of IoT devices 110 based on guidance provided by resource policy coordinator 130 (block 840). The guidance may direct readings to be processed in subsets grouped based on common factors that allow processing efficiencies. For example, data dispatchers 150 may route readings from multiple IoT devices 110 that are grouped together.

According to an embodiment, the IoT devices 110 may include a security system that includes video cameras, motion detectors, audio sensors and lights. A rule may indicate that a video camera and light device is to be turned on when motion is detected based on readings sent from a camera motion sensor. Additionally, if the audio sensors report a sound that is analyzed to detect a gunshot, the event is to be handled as critical and sent to a dedicated task executor 160 as quickly as possible (i.e., real time).

At block 850, task executor 160 may process the assigned readings and events. For example, based on a policy provided to data dispatcher 150, group of sensors may be assigned to task executor with particular priorities. A real time fast dedicated task executor 160 may be assigned for critical reading or processes, while readings may be assigned to other task executors 160.

According to an embodiment, task executor 160 may receive ongoing readings from a particular IoT device 110 that is required to be processed based on prior readings. For example, if the temperature reading increases 1 degree within 5 second, an action may be required. In this instance, the previous temperature may be cached at the processing task executor 160 and the rule (and corresponding action) may be executed in a minimal time.

At block 860, multi-phase action reducer 170 may resolve conflicts in actions output by the task executors 160. For example, multi-phase action reducer 170 may determine whether actions with conflicting priorities are to be applied to IoT devices 110 and resolve the conflicts based on predetermined policy. Multi-phase action reducer 170 may execute different scenarios based on different action queue phases 170-1 to 170-n. For example, multi-phase action reducer 170 may input the combination of actions into a model based on current readings to determine whether a particular action (or combination of actions) is to be executed.

At block 870, final action executor may execute actions that are output by multi-phase action reducer 170 after handling any conflicts.

Systems and/or methods described herein may implement a multistep system for processing readings from IoT devices. The system may include a dispatcher, processing units and an action reducer which may be applied to a large volume of real time events. The system provides a scalable flow for coordination, priority sorting and for performance optimization. The system may assign different priorities to rules and devices.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to a telecommunications service provider providing applications to a customer, in other implementations, other types of customer-provider relationships may be supported.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method, comprising:
receiving datasets of readings from a plurality of Internet of Things (IoT) devices;

identifying rules for processing the readings from the plurality of IoT devices, wherein each rule is associated with a priority;

dividing the datasets of readings into a plurality of subsets of the readings based on the rules for processing the readings;

determining policies to be applied to routing of the readings;

routing, based on the policies, the plurality of subsets of the readings to processing units to be processed in parallel by the processing units;

processing the subsets of the readings to generate a list of actions, wherein each action in the list of actions identifies an action to be performed by an IoT device and is generated based on a rule of the rules for processing the readings from the plurality of IoT devices;

resolving conflicts in the list of actions based on priorities associated with the rules, wherein resolving the conflicts in the list of actions includes determining to execute an action generated based on a lower priority rule when an action generated from a conflicting higher priority rule is not in effect; and executing the actions.

2. The computer-implemented method of claim 1, wherein determining policies to be applied to routing of the readings further comprises:

determining the policies based on sensor volume, rule characteristics and running status of the processing units.

3. The computer-implemented method of claim 1, wherein determining policies to be applied to routing of the readings further comprises:

randomly assigning the processing units with a predetermined number of IoT devices, events and rules over particular predetermined time spans.

4. The computer-implemented method of claim 1, wherein routing the plurality of subsets of the readings further comprises:

routing the plurality of subsets of the readings based on a policy that balances processing time for the readings from the plurality of IoT devices with a subset of complex cases.

5. The computer-implemented method of claim 1, wherein determining policies to be applied to routing of the readings further comprises:

determining the policies based on device affinity for processing among a minimal number of processing units.

6. The computer-implemented method of claim 1, wherein determining policies to be applied to routing of the readings further comprises:

determining the policies based on rule affinity for processing rules with similar properties by a same subset of the processing units.

7. The computer-implemented method of claim 1, wherein determining policies to be applied to routing of the readings further comprises:

determining the policies based on a high priority for processing a subset of the readings by a dedicated subset of the processing units.

8. The computer-implemented method of claim 1, wherein determining policies to be applied to routing of the readings further comprises:

determining the policies based on maximum parallelism of processing of the readings by the processing units.

9. The computer-implemented method of claim 1, wherein resolving the conflicts in the list of actions further comprises:

inputting conflicting actions into a model based on the readings to determine whether a particular action is to be executed.

10. The computer-implemented method of claim 1, wherein executing the actions further comprises:

implementing an action via one or more of the plurality of IoT devices.

11. The computer-implemented method of claim 1, wherein executing the actions further comprises:

forwarding a notification to a device associated with user personnel.

12. A device, comprising:

a processor configured to execute instructions to:

receive datasets of readings from a plurality of Internet of Things (IoT) devices;

identify rules for processing the readings from the plurality of IoT devices, wherein each rule is associated with a priority;

divide the datasets of readings into a plurality of subsets of readings based on the rules for processing the readings;

determine policies to be applied to routing of the readings;

route, based on the policies, the plurality of subsets of the readings to processing units to be processed in parallel by the processing units;

process the subsets of the readings to generate a list of actions, wherein each action in the list of actions identifies an action to be performed by an IoT device and is generated based on a rule of the rules for processing the readings from the plurality of IoT devices;

resolve conflicts in the list of actions based on priorities associated with the rules, wherein, when resolving the conflicts in the list of actions, the processor is further configured to determine to execute an action generated based on a lower priority rule when an action generated from a conflicting higher priority rule is not in effect; and execute the actions.

13. The device of claim 12, wherein, when determining the policies to be applied to routing of the readings, the processor is further configured to:

determine the policies based on sensor volume, rule characteristics and running status of the processing units.

14. The device of claim 12, wherein, when determining policies to be applied to routing of the readings, the processor is further configured to:

randomly assign the processing units with a predetermined number of IoT devices, events and rules over particular predetermined time spans.

15. The device of claim 12, wherein, when routing the plurality of subsets of the readings, the processor is further configured to:

route the plurality of subsets of the readings based on a policy that balances processing time for the readings from plurality of IoT devices with a subset of complex cases.

16. The device of claim 12, wherein, when determining policies to be applied to routing of the readings, the processor is further configured to:

determine the policies based on device affinity for processing among a minimal number of processing units.

17. The device of claim 12, wherein, when determining policies to be applied to routing of the readings, the processor is further configured to:
determine the policies based on rule affinity for processing rules with similar properties by a same subset of the processing units.

18. The device of claim 12, wherein, when determining policies to be applied to routing of the readings, the processor is further configured to:
determine the policies based on a high priority for processing a subset of the readings by a dedicated subset of the processing units.

19. A non-transitory computer-readable medium including instructions to be executed by a processor, the instructions including one or more instructions, when executed by the processor, for causing the processor to:
receive datasets of readings from a plurality of Internet of Things (IoT) devices;
identify rules for processing the readings from the plurality of IoT devices, wherein each rule is associated with a priority;
divide the datasets into a plurality of subsets of the readings based on the rules for processing the readings;
determine policies to be applied to routing of the readings;
route, based on the policies, the plurality of subsets of the readings to processing units to be processed in parallel by the processing units;
process the subsets of the readings to generate a list of actions, wherein each action in the list of actions identifies an action to be performed by an IoT device and is generated based on a rule of the one or more rules;
resolve conflicts in the list of actions based on priorities associated with the rules, wherein resolving the conflicts in the list of actions includes determining to execute an action generated based on a lower priority rule when an action generated from a conflicting higher priority rule is not in effect; and
execute the actions.

20. The computer-readable medium of claim 19, wherein, when determining the policies to be applied to routing of the readings, the one or more instructions further includes instructions for causing the processor to:
determine the policies based on sensor volume, rule characteristics and running status of the processing units.

* * * * *